United States Patent Office 2,954,643
Patented Oct. 4, 1960

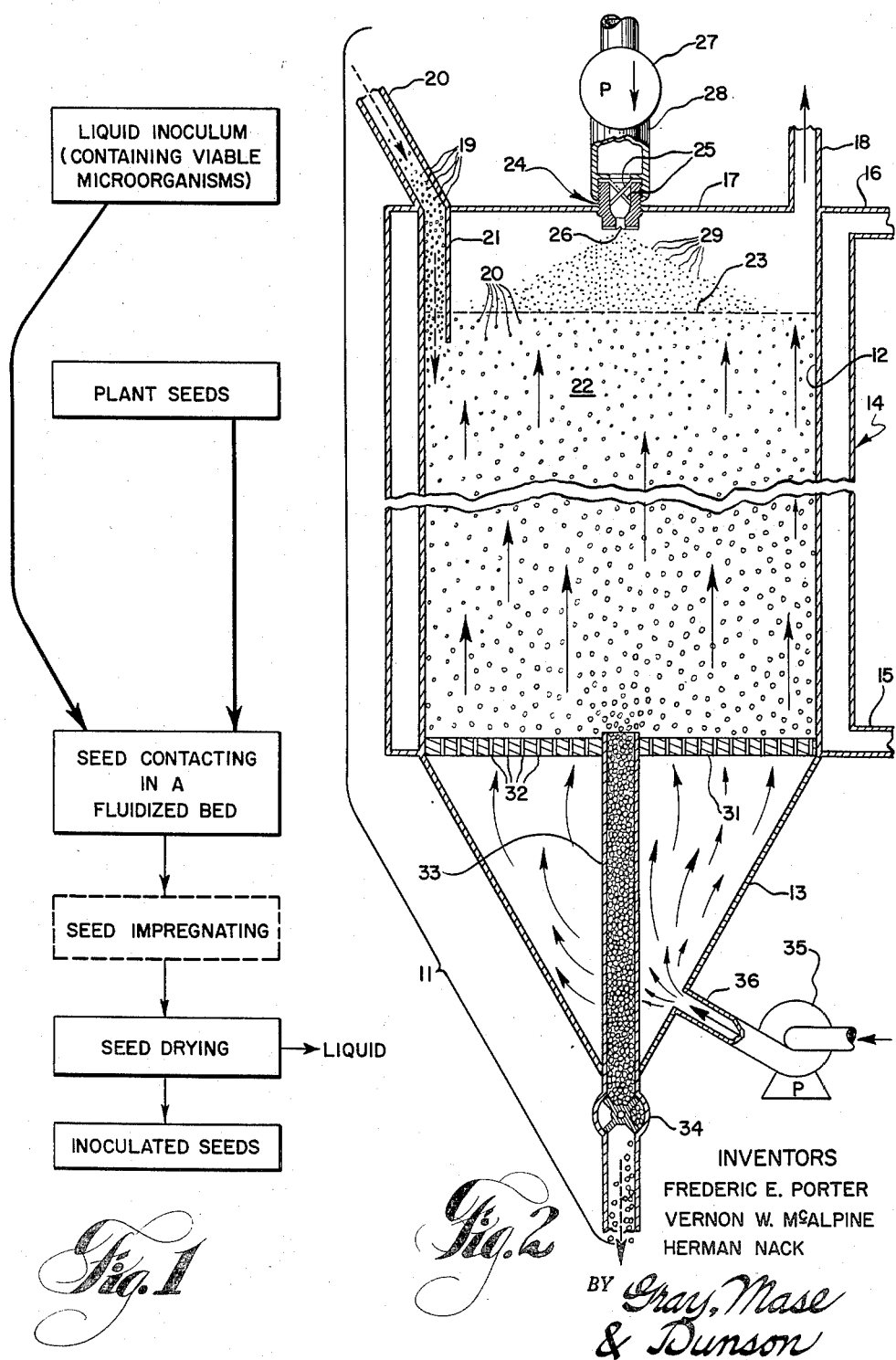

2,954,643

SEED TREATMENT WITH MICROORGANISMS AND GAS

Frederic E. Porter, Vernon W. McAlpine, and Herman Nack, Columbus, Ohio, assignors, by mesne assignments, to Northrup, King & Co., Minneapolis, Minn., a corporation of Minnesota Filed June 11, 1959, Ser. No. 819,724

9 Claims. (Cl. 47—58)

This invention relates to treatment of plant seeds with viable microorganisms. More particularly, the invention relates to rapid inoculation of seeds in a fluidized state with an inoculum liquid containing viable microorganisms.

For many years, agricultural technologists have inoculated plant seeds with microorganisms to improve the plants growing from the seeds. For example, nitrogen-fixing bacteria have been used to treat seeds of legumes so that the resulting plants will be less dependent upon soil nitrates for growth.

Inoculation techniques require contacting the seeds with microorganisms. Frequently an inoculum liquid, such as a bacterial culture dispersed in water, is used for such contacting. In addition to the microorganisms, sometimes auxiliary, beneficial materials, such as surface-tension depressants and growth-promotion materials (i.e., organic nitrogen sources, brewers yeast, asparagine, etc.) also have been included in the liquid inoculum. In recent years, organisms on carriers, such as peat, charcoal, and the like, have been dispersed in a dilute aqueous syrup to provide inoculum liquids. Materials recognized as detrimental and destructive to the microorganisms, seeds, and plants generally have been avoided and excluded from inoculum liquids.

Inoculum liquids have been applied by a variety of techniques, including slurry, spray, immersion, and like treatments. Frequently, conventional techniques have required that the seeds be in a state of movement while in contact with an inoculant to further uniformity of application to the seeds. For example, seeds have been inoculated by techniques, such as spraying inoculum liquids on seeds which are tumbled in a barrel or otherwise mixed, or by slurrying a mixture of seeds and an inoculum liquid.

Following the step of contacting the seeds with an inoculum liquid, there is a treatment to remove the liquid content of the inoculum to provide an easily handled, useful, inoculated seed. Air drying or forced-air drying frequently have been used to bring the seeds to a moisture content conducive to survival of the seeds. This seed drying also puts the inoculated seeds into condition for passing through conventional drills or for handling by conventional planting equipment and techniques.

Customarily, in seed inoculation processes it is sought to produce uniformly inoculated seeds having a minimum infective dose of organisms per seed. The minimum infective dose is the smallest number of microorganisms that will produce an infection in each and every host plant. This level of inoculation is dependent on the particular seeds and particular organisms being employed, and the infection desired. For Rhizobium spp. on legume seeds, the minimum infective dose is a population of 50 to 1000 viable, infective and effective bacteria per seed. This bacteria population per seed approximates that obtained with commercial inoculants of Rhizobium spp. when applied by present-day techniques to alfalfa seeds.

A recent development in the seed treatment art, illustrated by U.S. Patent No. 2,768,095, Tadema et al., is a liquid coating process involving application of a biocidal substance to seeds. In this process the seeds in a fluidized state move directionally with a solution of the biocidal substance in the form of a spray of fine, atomized droplets being sprayed into the fluidized seed bed beneath the upper boundary of the bed. Such a coating process, if applicable for inoculation of seeds with viable microorganisms, would appear to permit a uniform distribution of an inoculum liquid on seeds.

It is to be understood that a fluidized bed is a mass of solid particles which exhibits the liquidlike characteristic of mobility, hydrostatic pressure, and an observable upper free surface or boundary zone across which a marked change in concentration of particles occurs. A fluidized bed may be achieved through suspending solid particles by means of a stream of gas rising past the particles. The upwardly flowing gas expands the mass of particles so that the packing arrangement of the particles is more open. In the absence of channeling, fluidization begins to exist when the pressure drop through the bed of particles almost equals the net effective weight of the particles per unit area of the bed. Slightly higher velocity gas streams fully support the solid particles and such beds are then considered to be fluidized beds. An increase in the velocity of the fluidizing gas supporting medium increases the random motion of the particles. It is desirable in practice of fluidized-bed coating processes that the fluidization be carried forth so that intensive random mixing of the solid particles takes place in the fluidized bed to assure uniform distribution of the coating substance. In the fluidized-bed art it is recognized that fluidization is difficult, if not impossible, under certain conditions. For example, an insufficient velocity of the supporting medium will not provide fluidization. A rapid addition of a large amount of liquid also is recognized as troublesome and generally leading to grossly wet particles, which agglomerate with a disappearance of the fluidized state.

Microorganisms which benefit plants directly generally are recognized as susceptible to adverse conditions, unless the organisms form a spore or other resistant form. The inoculation art is beset by unique problems because of a necessity of sustaining life of the viable microorganisms until infection takes place. Inoculant manufacturers recognize that the viable microorganism content of an inoculant decreases after preparation. Usually unsold inoculants are withdrawn from sale at various periods after their preparation and replaced by more recently prepared inoculants of higher viable potency and quality. The inoculant manufacturers and also the seed planters recognize that even after the inoculating organisms have been applied to the seeds viable organisms continue to die. Generally a prompt planting of inoculated seeds within a day or two after seed inoculation is recommended else the number of existing viable organisms on the seeds will be insufficient to produce a desired, beneficial infection. In addition to microorganisms being sensitive to and destroyed in appreciable numbers by normal seed handling and storage conditions, other more stringent and severe conditions cause even greater losses of microorganisms. For example, conditions such as extreme dryness, high temperatures, or the like are lethal to such organisms.

In the seed inoculation art it is desirable, for efficient and economical use of the inoculant, not only to obtain a uniform distribution of inoculant on individual seeds but also it is just as important to avoid destruction of viable microorganisms. Larger numbers of viable organisms may be obtained on inoculated seeds with equivalent inoculants, if process conditions which are destructive to the organisms are eliminated and avoided.

Also more efficient and economical processes result. Smaller amounts of equivalent inoculants with process conditions conducive to organism survival will provide populations of viable organisms per seed which are equal to or larger than those populations per seed from processes involving more lethal conditions.

This invention, in general, comprises rapid contacting of seeds in a gas-fluidized state with an inoculum liquid containing viable microorganisms. Substantial amounts of inoculum liquid contact fluidized seeds and quickly and uniformly distribute microorganisms with substantially complete transfer of all applied viable organisms to the seeds. The number of viable organisms finally present on the inoculated seeds is dependent upon and determined by the rate of application. With the amounts and rates of application of liquid inoculum of this invention a complete transfer of viable microorganisms to the seeds without loss of viability may be obtained. In addition the wetted inoculated seeds may be dried by removal of the liquid content of the inoculum to yield seeds of a suitable moisture content with a minimal loss of organism life.

The liquid inoculums employed in the process may be any of the present-day liquid inoculums, which contain viable microorganisms. The term "viable microorganisms" is to be understood as meaning those viable organisms, which benefit a plant directly by giving rise to a desirable, beneficial infection in the host plant. Included within the suitable viable microorganisms are bacteria, fungi, and viruses. Suitable bacteria include members of the genus Rhizobium, such as *R. trifoli*, *R. japonicum*, *R. meliloti*, *R. leguminosarum*, *R. phaseoli*, *R. lupini*, and others. Suitable fungi include Boletus spp., Amanita spp., Rhizophagus spp. and others. Viruses include those that produce infection resistance, in plants, to important plant diseases, such as Southern Bean mosaic, tobacco mosaic, aster yellows, and others. Other suitable viable microorganisms known to those skilled in the art are also intended to be included within the term: "viable microorganisms."

The inoculum liquids which may be used comprise a suitable liquid medium and viable microorganisms. Genrally the liquid medium is water. Water is usually preferred. In some special applications with particular organisms low-boiling aromatic liquids, such as methanol, ethanol, diethyl ether, hexane, and the like are useful to replace all or part of the water. Generally in such applications the liquid inoculants should be freshly prepared and used immediately to minimize exposure of organisms to such solvents. The viable microorganisms being extremely small discrete particles are dispersed or suspended in the liquid medium. Conventional and well-known techniques may be used to prepare the inoculum liquids. For example, bacteria may be grown in a suitable growth medium and used as a whole culture. Alternatively the bacteria may be isolated from a growth medium, and then simply dispersed or suspended in water. Auxiliary beneficial materials, such as surface tension depressants and growth-promotion materials may be included in the inoculum liquids. In some applications it is desirable to add materials such as sucrose, gum arabic, and gelatin to a culture which is subsequently dispersed in water to provide the inoculum liquid. A liquid inoculant of this nature provides inoculated seeds having a protective coating containing the microorganisms.

The amount of inoculum liquid to be used is dependent on the concentration of viable microorganisms, the particular type and amount of seeds being inoculated, and the desired organism population per seed. When processing small seeds of which a large number constitute a pound of seed, a larger number of microorganisms must be employed, as by increasing the amount or the microorganism content of the inoculum liquid, than where processing large seeds in order to provide equivalent microorganism populations per seed. Customarily one knows the particular fluidization apparatus being employed, the amount of seed being treated (thus indirectly the number of seeds) and also the desired organism population per seed, generally the minimum infective dose. From such data one skilled in the art readily selects the amount of an inoculant liquid of a particular organism concentration and may dilute the same to assure economic use and good distribution of the inoculant over the seed surfaces upon contact therewith. Conventional practice employs aqueous inoculum slurries having organism concentration of $10^6$ to $10^8$ organisms per milliliter. These conventional aqueous inoculum slurries and other inoculum slurries of greater organism concentrations may be used in the process. Desirably to minimize the amount of liquid removal from the wetted inoculated seeds, inoculum liquids should be as low in liquid content as possible without impairment of organism viability and uniformity of distribution on the seed surface throughout the mass of seeds. Concentrated inoculum liquids having organism populations as high as $10^{12}$ organisms per milliliter are suitable. Inoculum liquids having $10^6$ to $10^{10}$ organisms per milliliter are preferred.

With most inoculum liquids, it is not necessary to apply an amount of inoculum liquid greater than about 10 percent by weight of the mass of fluidized seeds in order to provide inoculated seeds with desired organism populations. Amounts of high-liquid-content inoculum liquids up to about 25 percent by weight and slightly more of the weight of the mass of fluidized seeds may be applied within several minutes by the process of the invention without agglomeration of the fluidized seeds or loss of the fluidized state. Amounts of inoculum liquid somewhat larger than 25 percent by weight are operable under some circumstances. However, these larger amounts provide processes with economic drawbacks. With amounts of high-liquid-content inoculum liquid of about 30 or 35 percent or larger by weight, the cost of drying or removal of the liquid from the wetted seeds increases to an extent that such processes are not commercially feasible. An acceptable amount of inoculum liquid for application by the process of the invention is from about 1 to 10 percent by weight of the mass of the fluidized seeds with those inoculum liquids having liquid contents greater than about 50 percent by weight. The preferred amount of inoculum liquid is from 3 to 7 percent by weight of the mass of fluidized seeds.

To provide the superior process and advantageous results of the invention the inoculum liquid should be applied to the fluidized seeds in less than about 8 minutes. Preferably the application time does not exceed 3 minutes. With long periods for application of microorganisms, the earlier applied microorganisms are subject to loss of viability. Later applied microorganisms then serve only to replace earlier applied microorganisms which have died and do not result in an over-all cumulative increase in the number of viable microorganisms on the seeds. With application times longer than several minutes, there is a significant reduction in the numbers of viable organisms on the seeds when compared to the numbers of applied organisms.

Rate of application of inoculum liquid by the process of the invention may be as high as about 10 percent by weight of the fluidized seeds for each minute of application. A rate of application per minute from 2 to 10 percent by weight of the mass of fluidized seeds is preferred. Rapid application and contacting provide a rapid and efficient process. The invention provides savings in process time and also materials. Uniform distribution of inoculum liquid on the seed surfaces is obtained with substantially complete transfer of all viable microorganisms in the inoculum liquid and with little or no loss in viable organisms.

The particular fluidizing apparatus used imposes a limitation on the maximum amount of inoculum liquid which may be applied by the process. The maximum amount of rapidly applied inoculum liquid is an amount above which no increase in gas flow will enable fluidization of the grossly wetted seeds. The cross-sectional area of the particular fluridization apparatus determines this maximum amount. Apparatus with small cross-sectional areas have small maximum amounts. A wall effect in such apparatuses apparently leads to an inability to fluidize seeds after wetting with large amounts of inoculum liquid no matter how much the flow of the fluidizing gas is increased. The maximum amount of rapidly introduced inoculum liquid in a tubular fluidizing column of about 4 inches in diameter is about 5 percent by weight of the mass of fluidized seeds. The maximum amount increases with an increase in diameter of the fluidized bed.

While there is a minimum flow of fluidizing gas necessary to obtain fluidization of the seeds, somewhat higher gas flows should be employed in the process to assure adequate maintenance of the wetted seeds in a fluidized state after addition of the inoculum liquid. Otherwise, it is necessary upon addition of the inoculum liquid to increase the gas flow to maintain the wetted seeds in a fluidized state. Channeling in the fluidized bed of seeds and also agglomeration of the wetted seeds will occur in the absence of a suitable gas flow.

In the process of the invention the inoculum liquid in the form of large droplets and/or a small stream is brought into contact with the fluidized bed of seeds. Preferably the initial contact is with the upper free surface of the fluidized bed of seeds. However, it is also possible to introduce the inoculum liquid directly into the fluidized bed provided the introduction takes place in the upper two-thirds of the fluidized bed. Introduction of liquid inoculum into the lower one-third of the fluidized-bed results in grossly wetted seeds from which liquid inoculum will drip and collect in the fluidization apparatus and in general provides a process which is wasteful of valuable inoculum liquid. The large droplets may range in size from about 140 to 5000 microns in diameter. The cross-sectional diameter of the small streams may range from about 140 to 5000 microns. Preferably the process comprises spraying an inoculum liquid in the form of droplets of an average mean diameter of about 200 to 300 microns to contact the upper free surface of the fluidized bed of seeds. Surprisingly, an applying of large droplets and/or a fine stream provides an almost instantaneous distribution of inoculum liquid across the seed surfaces. The rapid and uniform distribution across the seed surfaces of inoculum liquid applied in such a gross form is readily illustrated by stopping fluidization within a few seconds after completion of application of the inoculum liquid and checking liquid and organism distribution on random samples of seeds from the mass of seeds. With fine or small droplets (i.e. about 100 microns or smaller in diameter) considerable losses of viable microorganisms and inoculum liquid are encountered. These losses may occur from death of the organisms or entrainment of the organisms and liquid in exiting fluidizing gas, and are particularly noticeable when the inoculum liquid is sprayed in fine droplet form on the upper free surface of the fluidized bed of seeds.

In the drawings:

Fig. 1 is a schematic flowsheet of an inoculation process incorporating the invention; and Fig. 2 is a partial diagrammatic and partial cross-sectional view of a suitable apparatus for carrying out the invention.

The inoculation process illustrated in Fig. 1 comprises the essential steps of contacting seeds in a fluidized bed with an inoculum liquid containing viable organisms and drying the seeds to obtain inoculated seeds. An optional step of seed impregnating (shown by dotted lines) may be incorporated in the process intermediate of the contacting and drying steps when it is desired to obtain seeds having viable microorganisms incorporated beneath the surface of the seeds. This optional seed impregnating step may consist of a reduced pressure treatment, such as described in detail in copending application, Serial No. 689,755, filed October 14, 1957 and issued April 12, 1960, as Patent No. 2,932,128. The seed drying step may be carried out in a conventional manner to reduce the moisture content to a level conducive to survival of both the seeds and organisms. Such ordinary techniques as drying the wetted seeds from the contacting step by environmental air drying of shallow layers of the wetted seeds in pans may be used. Forced-air drying may be used. Warm air may be used, although the air temperatures should be below those temperatures destructive of organism life. Inmpregnating and/or drying of the wetted inoculated seeds within the apparatus used for contacting with inoculum liquid are permissible. Generally the process is carried forth in a batch manner with process steps in sequence. However, a continuous mode of operation is possible with separate apparatuses for each process step. In this continuous mode of operation seeds are withdrawn continuously from the apparatus for contacting and pass into apparatuses for the other steps, while seeds also are continuously introduced into the apparatus for contacting.

Referring to Fig. 2 the illustrated apparatus comprises a fluidization column, generally designated 11, which includes an upper cylindrical section 12 and a conical gas plenum section 13. An auxiliary heating or cooling jacket 14 surrounds section 12. A heat exchange liquid, not illustrated, enters jacket 14 through pipe 15, flows through the jacket 14 to enable a heating or cooling, if desired, of section 12, and exists through pipe 16. The upper end of column 11 is closed substantially by top plate 17. A conduit 18 opening into column 11 is located at the upper end of column 11 for removal of an exiting fluidizing gas, not illustrated, although the direction of the flowing gas is illustrated by means of solid arrows. Seeds 19, which are transported by a means not illustrated to an elevation higher than column 11, are introduced into the column 11 through a seed conduit 20 opening into the upper end of column 11. A baffle plate 21, extending downward from top plate 17, deflects the entering seeds 20 downward into the column 11. Seeds 20 within column 11 are maintained in a fluidized bed 22, having an approximate upper free surface designated by the dotted line 23. A spray nozzle 24, having internal vanes 25 and an orifice 26, is located approximately in the center of top plate 17 with the orifice 26 opening into the upper end of column 11. Although only one nozzle is illustrated, a plurality of nozzles may be used. Nozzles with internal vanes of the type described in U.S. Patent No. 2,305,210 are suitable. Liquid inoculum, not illustrated passes through pump 27 and pipe 28 into nozzle 24 and exists from orifice 26 as a plurality of large droplets 29.

A gas distributor plate 31 having a plurality of small holes or perforations 32 therethrough is located at the junction of the cylindrical ring section 12 with gas plenum section 13 to separate gas plenum section 13 from section 12 of the column 11. Preferably the small holes or perforations 32 are smaller than the particular seeds 19 being processed to avoid seeds 19 entering the gas plenum section 13. The number and size of the perforations 32 is such as to provide about a 10 percent or higher pressure drop in the fluidizing gas passing through the distributor plate 31. With a pressure drop less than about 10 percent an undesirable channeling may occur in the fluidized bed 22. The distributor plate 31 or an equivalent means which provides a 10 percent or higher pressure drop eliminates this undesirable channeling and permits a uniform distribution of air over the area of the fluidized bed 22. A stand-pipe 33 runs upwardly through the apex of conical gas plenum section 13 through distributor plate 31 and opens into the fluidization column 11. Connected to the lower portion of stand-pipe 33 is a valve 34 for control and removal of inoculated seeds 20 that collect in stand-pipe 33.

The fluidizing gas, its direction of flow being shown by solid arrows, is introduced by means of a blower 35 through a conduit 36 into the gas plenum section 13. This fluidizing gas passes from the gas plenum section 13, through the holes or perforations 32 of the distributor plate 31 into the fluidization column 11, maintains fluidization of the seeds 19 in the fluidized bed 22, and exits from column 11 through the conduit 18 at the top of section 12.

If desired, the fluidizing gas exiting from conduit 18 may be recirculated by a means not illustrated to the blower 35 and back through the gas plenum section 13 and column 11. It is generally advisable to remove any liquid vapors entrained in the exiting gas before recirculation of this gas. A suitable fluidization gas at normal environmental conditions is a gaseous substance, which is substantially inert toward the particular seeds and the particular organisms under the conditions, such as temperature and pressure, of the process. Air is preferred, and in most cases air is used. If, however, owing to the nature of the seeds or organisms, the presence of oxygen is undesirable, a fluidizing gas such as carbon dioxide or nitrogen may be used. Preferably the introduced fluidizing gas is substantially dry or has a low relative humidity. The temperature of fluidizing gas should not be so high as to be destructive of organism life. Generally normal room temperature air (i.e. air at 80±20° F.) is used. Somewhat higher temperature air up to about 140° F. may be used with some organisms with little loss of organism life.

The following examples present specific embodiments of the invention and serve to further illustrate the invention.

EXAMPLE I

*Preparation of inoculum liquids.*—Several strains of bacteria of the genus Rhizobium spp. were grown in separate yeast mannitol broths. Whole cultures of these several strains were blended to provide inoculum liquids. In some instances the blends were diluted by addition of sterile water to provide the inoculum liquids. Culture counts of inoculum liquids, so prepared, were made by preparing decimal dilutions and transferring 0.1 ml. aliquots of each dilution to a separate yeast mannitol agar plate. The aliquots were streaked over the agar surfaces of the plates with a sterile glass rod. Colonies on the plates were counted after an incubation period of about 4 days at approximately 70° F.

*Contacting of fluidized seed.*—Nine hundred pounds of alfalfa seeds (about 220,000 seeds per pound) were introduced into the apparatus illustrated in Fig. 2. The diameter of the upper cylindrical section of the apparatus was about three feet. Air at about 70° F. was introduced into the apparatus to fluidize the introduced alfalfa seed. The air flow of about 1,300 c.f.m. or a superficial velocity of 3.1 feet/second suspended the seeds in a fluidized bed with intensive mixing and random movements of the seeds throughout the bed. About 45 pounds of an inoculum liquid having a Rhizobium spp. concentration of $57 \times 10^6$ viable bacteria per milliliter were sprayed as large droplets within 35 seconds to contact the upper free surface of the fluidized bed of seeds. The spray nozzle was about 14 inches above the upper free surface of the fluidized bed and was directed generally toward the central area of the upper free surface. The sprayed droplets of inoculum liquid ranged in size from 140 to 300 microns in diameter with an approximate mean size of 200 to 300 microns. No disruption of the fluidized state of the seeds was apparent from contact with the droplets. Uniform distribution of inoculum liquid of the droplets appeared to take place almost as soon as the droplets contacted the seeds as evidenced by the uniform wetted appearance of seeds throughout the fluidized bed. A few seconds after completion of the spraying, the wetted seeds were discharged from the apparatus. Ten gram samples of the wetted seeds were selected at random. Moisture determinations of samples of wetted seed showed that substantially 100 percent of the liquid inoculum accompanied the wetted seeds. A close agreement among the moisture determinations showed substantially uniform distribution of the inoculum liquid throughout the seeds. Samples of wetted seeds were washed with 100 ml. of sterile, distilled water. Decimal dilutions of the washings were made and 0.1 ml. aliquots were transferred to separate yeast maunitol agar plates. The aliquots were streaked over the agar plate surfaces with sterile glass rods. Colonies on the plates were counted after an incubation period of about 4 days at 70° F. Plate counts showed that substantially 100 percent of the sprayed viable bacteria were found on the wetted seeds as viable bacteria. Agreement among the plate counts showed uniform distribution of the viable bacteria throughout the seeds.

*Drying of wetted, inoculated seeds.*—The wetted seeds withdrawn from the apparatus were air dried in shallow pans to a moisture level of about 8 percent by weight. After drying random samples of the dried seeds were planted in sterile media. The plants from these plantings were found to exhibit nodules on their roots.

EXAMPLE II

A lot of nine hundred pounds of alfalfa seed was inoculated with bacteria of the genus Rhizobium spp. The aqueous inoculum liquid was prepared as illustrated in Example I and had a Rhizobium spp. concentration of $57 \times 10^6$ viable bacteria per milliliter. The alfalfa seeds introduced into the apparatus had a moisture content of about 5.4 percent by weight. The seeds were fluidized with atmospheric air at about 70° F. having a relative humidity of 40 percent with an air flow from 800 to 1300 c.f.m., or a superficial velocity of 1.9 to 3.1 feet/second. After fluidization for 15 minutes a small sample of seeds withdrawn from the apparatus had a moisture content of 4.8 percent by weight. 45.5 pounds of the liquid inoculum then were sprayed within 35 seconds on the air-fluidized bed of alfalfa seed in the same manner as described in Example I. During the spraying and while fluidizing the wetted seeds the air flows was about 1300 c.f.m., or a superficial velocity of 3.1 feet/second. As in Example I a uniform distribution of the inoculum liquid throughout the fluidized seeds appeared to take place almost immediately upon contact of the spray droplets with the seeds. Samples of seeds withdrawn from the apparatus immediately after addition of the inoculum liquid had moisture contents of about 9.5 percent by weight. Plate count measurements of washings of seed samples withdrawn from the column at this time showed 100 percent of the sprayed viable bacteria to be uniformly distributed on the wetted inoculated seeds as viable bacteria.

*Drying of wetted, inoculated seeds.*—Air fluidization of the wetted seeds was continued in the apparatus employed for fluidization for 12 minutes after addition of the last of the liquid inoculum. The dried seed was then discharged from the apparatus. Randomly selected samples of this seed had moisture contents of about 7 percent by weight, a moisture content satisfactory for conventional handling, storage, merchandising, and planting of the seed. Bacteria plate counts of washings of randomly selected samples of this dried seed showed about 75 percent of the applied viable bacteria to be uniformly distributed throughout the dried inoculated seeds as viable bacteria.

EXAMPLE III

To an aqueous inoculum liquid, prepared as described in Example I, there was added sucrose, gum arabic, and gelatin, in sterile water to provide an inoculum liquid containing about 57 percent by weight of sucrose, 2 percent by weight of gum arabic, and 2 percent by weight of gelatin, and having a Rhizobium spp. concentration of about $6 \times 10^8$ viable bacteria per milliliter. Alfalfa seeds were inoculated with Rhizobium bacteria, as illustrated in Example II, with the inoculum liquid prepared in this example. A total amount of the inoculum liquid of 10 percent by weight of the fluidized seeds was sprayed on the fluidized seeds in about 8 minutes. Plate count measurements of washings of samples of wetted seeds taken immediately after completion of the spraying showed substantially 100 percent of the sprayed viable bacteria to be uniformly distributed throughout the dried inoculated seed as viable bacteria. After air drying of the wetted seeds, the dried seeds had a glossy surface coating holding the viable bacteria adherently to the inoculated seed. Upon planting in sterile media these inoculated seeds produced plants exhibiting nodules on their roots.

EXAMPLE IV

In the same general manner as described in Examples I and II additional lots of several different amounts of alfalfa seed were inoculated with bacteria of the genus Rhizobium spp. Fluidization apparatuses having upper cylindrical section diameters of about 3 feet, 8 inches, and 4 inches, respectively, were employed. Several different amounts of inoculum liquids at several different rates of spraying were used for various seed lots. The bacteria concentrations of these inoculum liquids were varied for different lots of seeds. Inoculum liquids were sprayed onto the upper free surface of the fluidized beds of seeds and in some runs were sprayed beneath the upper free surface and into the fluidized beds. Some lots of seeds were inoculated by spraying small streams and/or large droplets for contacting of the fluidized seeds.

In the 4 inch diameter fluidization column the maximum amount of inoculum liquid that could be sprayed in a 2-3 minute period in large droplet form, while still maintaining the seeds in a fluidized condition, was about 5 percent by weight of the fluidized bed of wetted seeds, even with air flows as large as 3 to 4 times the minimum air flow necessary to fluidize the dry seeds. Similarly with the 8 inch diameter column the maximum amount of inoculum liquid was found to be about 7 percent by weight and with the three-foot diameter column about 15 percent by weight. When the maximum amounts of inoculum liquid were applied at rates in excess of about 10 percent by weight of the mass of fluidized seeds per minute, difficulty was encountered in maintaining the seeds in a fluidized state, even with air flows 3 to 4 times the minimum air flow necessary to fluidize the dry seeds. With inoculum liquids of different bacteria concentrations it was possible to apply amounts of bacteria from a few to in excess of $10^9$ viable bacteria per seed with substantially complete transfer of all bacteria to the wetted seeds in a viable form. Inoculum liquids were successfully sprayed and/or streamed onto the upper free surface of the fluidized seed beds and also beneath the surface into the upper two-thirds of the fluidized seed beds with less than the maximum amounts of inoculum liquid and with application rates of less than 10 percent per minute while still maintaining the seeds in a fluidized state. When streams and/or large droplets of inoculum liquid were introduced into the lower one-third of the fluidized beds, inoculum liquid dripped from the fluidized seeds and collected inside the apparatus rather than rapidly distributing itself uniformly throughout the wetted seeds.

An amount of inoculum liquid of about five percent by weight of the fluidized seeds was sprayed in less than 35 seconds on the seeds. Samples of seeds were withdrawn for moisture and viable bacteria determinations from the apparatus while fluidization of the wetted seeds was continued for about one hour after completion of the spraying. The data in Table 1 present typical results of these determinations.

*Table 1*

RAPID CONTACTING

| | | | | | | | |
|---|---|---|---|---|---|---|---|
| Time (minutes) | [1] 0 | 1 | 11 | 25 | 37 | 50 | 61 |
| Percent Moisture of Seeds | 4.7 | 9.5 | 7 | 5.6 | 4.6 | 4.5 | 4.2 |
| Percent of Total Applied Viable Bacteria Present as Viable Bacteria on the Seeds | 0 | 100 | 75 | 9 | 6 | 4 | 2 |

[1] Spraying commenced at 0 time and completed within 35 seconds.

The bacterial death rate of the applied bacteria during drying or removal of the liquid content of the rapidly applied inoculum liquid from the seeds appeared to follow the classical curves for bacterial death from drying with bacterial death occurring most rapidly in the moisture range of 7 to 4.5 percent. However, since seed moisture contents of around 7 to 8 percent are acceptable for commerce, drying to a lower moisture level would not be necessary. Seeds having from 75 to 100 percent of the applied viable bacteria present as viable bacteria on the seeds may be obtained by the process of the invention.

In comparison with the process of the invention an amount of inoculum liquid of about five percent by weight of the fluidized seeds was sprayed to apply the total amount in 55 minutes on the seeds. Samples of seeds were withdrawn for moisture and viable bacteria determinations during application of the inoculation liquid and for a short time thereafter, while fluidization of the wetted seeds was continued. The following data in Table 2 presents typical results of these determinations.

*Table 2*

SLOW CONTACTING

| | | | | | | | | |
|---|---|---|---|---|---|---|---|---|
| Time (minutes) | [1] 0 | 11 | 20 | 30 | 40 | 50 | 60 | 80 |
| Percent Moisture of Seeds | 4.5 | 5.3 | 5.5 | 5.8 | 6.1 | 7.1 | 7.8 | 5.5 |
| Percent of Total Applied Viable Bacteria Present as Viable Bacteria on the Seeds | 0 | 27 | 27 | 27 | 27 | 27 | 25 | 10 |

[1] Spraying commenced at 0 time and completed within 55 minutes.

Comparison of the results of slow contacting of Table 2 with the results of rapid contacting of Table 1 readily shows rapid contacting of fluidized seeds with an inoculum liquid to be more efficient than, superior to, and to afford other advantages over slow contacting. Apparently in slow contacting of fluidized seed with viable microorganisms, a substantial number of organisms fail to survive. However, by rapid contacting, as illustrated in Table 1, little or no loss of viable organisms is encountered and the wetted inoculated seeds may be brought to a satisfactory moisture content with a minimal loss of organism life to yield an over-all more efficient utilization of inoculating organisms.

EXAMPLE V

About twenty-seven hundred pounds, measured volumetrically, of alfalfa seed were introduced into an apparatus of the general type illustrated in the drawings. The upper cylindrical section of this apparatus had a diameter of about 5.5 feet. Air, heated to between 120°–130° F. by passage over steam coils, was conducted through a blower powered by a 40 H.P. motor and then entered the gas plenum section of the apparatus. Air flow was regulated by means of a blast gate in the air conduit to provide an air flow of about 4400 c.f.m., or a superficial velocity of 3.1 feet/second in the upper cylindrical section. This air flow maintained the seeds in a fluidized bed with intensive mixing and random movement of the seeds throughout the fluidized bed. A culture of rhizobia from a commercial source was stored in a refrigerated bulk tank at 38±2° F. until used. Determinations of the bacteria concentration of this culture or inoculum liquid just prior to use showed about $2\times10^9$ bacteria per milliliter. About 25 gallons of this inoculum liquid was sprayed in about 2.75 minutes through three nozzles onto the upper free surface of the fluidized bed of seeds. The nozzles had spray angles of 120 degrees and were located four inches above the upper free surface. Each nozzle sprayed droplets ranging in size from 140 to 340 microns at a rate of about 3.2 gallons/minute over the 2.75 minute spray period to introduce a total amount of rhizobium culture equivalent to about 7.5 percent by weight of the fluidized seeds. Through control of the blast gate, the air flow was increased slightly during spraying to maintain the seeds in a fluidized state. Fluidization of the wetted seeds was continued for about five minutes after completion of the spraying. At this time fluidization was discontinued and the wetted seeds were discharged from the apparatus. Bacteria plate counts of washings with 100 ml. of a sterile diluent (e.g. buffered peptone water) of randomly selected samples of the wetted seeds showed about 85 percent or more of the sprayed bacteria to be uniformly distributed on the wetted seeds as viable bacteria.

*Seed impregnation.*—The wetted seeds were then transported to and placed in a tank for a reduced pressure impregnation treatment. Within about 3.5 minutes a reduced pressure of 25 inches of mercury was drawn on the wetted seeds; the reduced pressure was maintained for about 3 minutes; and the seeds returned to atmospheric pressure in about 3½ minutes.

*Impregnated seed drying.*—Following the reduced pressure treatment the seeds were placed in vertical chambers having perforated sides and dried by forcing warm 90°±10° F. air over the seeds to reduce the moisture content of the seeds to 8 percent or slightly lower by weight. Seeds from this drying operation had a moisture content satisfactory for conventional handling, storage, merchandising, and planting of the seed. Field plantings of the seeds treated according to this example yielded plants exhibiting nodules on their roots. Results of field plantings were confirmed by laboratory plantings made in sterile plant growth media.

While the preceding examples illustrate the invention with reference to seeds of legumes, other plant seeds may be employed. Illustrative, but not necessarily inclusive of all suitable plant seeds, are plant seeds of plants of the group Leguminosae, of the genus Pinus, and of the genus Aster. Seeds of plants having such common names as soy beans, wisteria, astragalus, vetch, lupine, clover, alfalfa, Scotch pine, Norway pine, white pine, red pine, oak, petunia, tobacco, bean, corn, aster, tomato, pea, and the like are suitable. Other plant seeds, as will be apparent to those skilled in the art, also will be suitable and are included within the scope of the invention.

It is to be understood that various alternatives, changes, modifications, and embodiments of the invention will be obvious to those skilled in the art from the preceding description and examples. It is intended to include all such alternatives, changes, modifications, and embodiments of the invention that fall within the true spirit and scope of the invention and to limit the invention only as set forth in the appended claims.

What is claimed is:

1. A process for inoculating seeds with viable microorganisms including the step of: contacting within less than about 8 minutes a mass of seeds being maintained in a fluidized state by an inert fluidizing gas with an inoculum liquid up to about 25 percent by weight of the mass, the inoculum liquid containing the viable microorganisms.

2. The process of claim 1 in which the contacting step is completed within less than 3 minutes and the rate of application is less than about 10 percent by weight of the mass per minute.

3. The process of claim 2 in which the contacting step is by spraying the inoculum liquid in the form of droplets of a size size from 140 to 5000 microns in diameter onto the upper free surface of the fluidized mass of seeds.

4. The process of claim 3 including drying of the fluidized mass of seeds after the contacting.

5. The process of claim 4 in which the drying includes maintaining the seeds in a fluidized state by the inert fluidizing gas with the fluidizing gas exiting from the mass of seeds having a higher moisture content than the fluidizing gas entering the mass.

6. In a process for inoculating plant seeds with viable microorganisms, the combination of steps of: flowing an inert fluidizing gas upwards through a mass of seeds to maintain the seeds in a fluidized bed; spraying within less than three minutes from 0.5 to 10 percent by weight of the mass of an inoculum liquid containing from $10^6$ to $10^{10}$ microorganisms per milliliter, the inoculum liquid being sprayed in the form of droplets of a size from 200 to 300 microns in diameter to contact seeds in the upper two-thirds of the fluidized bed; and drying the seeds to a moisture level conducive to survival of the seeds.

7. The combination of steps of claim 6 in which the inoculum liquid is sprayed in the form of fine streams of from 140 to 5000 microns cross-sectional diameter.

8. The combination of steps of claim 6 including intermediate the steps oof spraying and drying a step of subjecting the sprayed seeds to a treatment to incorporate microorganisms beneath the surface of the seeds.

9. The process of claim 8 in which the microorganisms are Rhizobium spp. and the plant seeds are alfalfa seeds.

References Cited in the file of this patent

UNITED STATES PATENTS 1,252,332  Earp-Thomas _____ Jan. 1, 1918

FOREIGN PATENTS 21,174  Great Britain _____ of 1909